E. FORRER.
PIPE JOINT.
APPLICATION FILED OCT. 20, 1919.
1,395,808.
Patented Nov. 1, 1921.
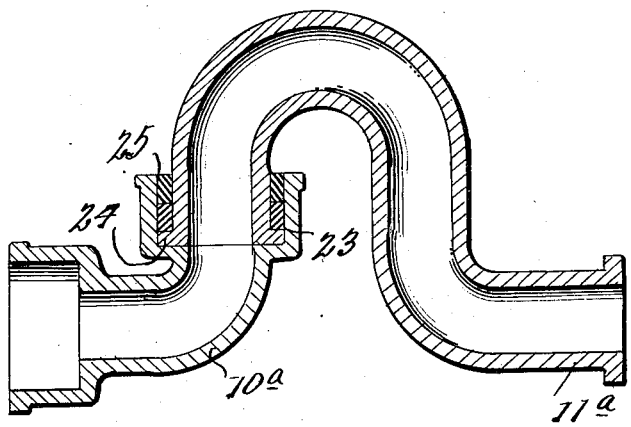
Eugene Forrer
INVENTOR
BY
ATTORNEY

UNITED STATES PATENT OFFICE.

EUGENE FORRER, OF BUDD LAKE, NEW JERSEY.

PIPE-JOINT.

1,395,808.   Specification of Letters Patent.   Patented Nov. 1, 1921.

Application filed October 20, 1919. Serial No. 332,055.

*To all whom it may concern:*

Be it known that I, EUGENE FORRER, citizen of Switzerland, residing at Budd Lake, in the county of Morris and State of New Jersey, have invented certain new and useful Improvements in Pipe-Joints, of which the following is a specification.

This invention has relation to pipe joints and has for an object to provide a coupling consisting of two parts of dissimilar form by virtue of which a considerable variety of fittings may be produced by connecting either end of one part with either end of the other part.

In addition to the foregoing this invention comprehends improvements in the details of construction and arrangement of parts, to be hereinafter described and particularly set forth in the appended claim.

In the accompanying drawing the figure is a view in section of my improved pipe coupling.

With reference to the drawings, $10^a$ indicates a right angular member and $11^a$ the second member having a semi-circular bend at one end and the other end extending at right angles to one terminal of said semi-circular portion. The member $10^a$ is enlarged at one end as at 23 to receive the end of the section $11^a$ which is provided with a flange 24. The flanged end 24 fits loosely within the enlarged end 23 and one or more gaskets 25 are extended around the inner end of the section $11^a$ and forced into the enlargement 23 against the flange 24. Any suitable adhesive such as cement or the like may be used if desired to secure the sections together subsequent to their adjustment. In this manner the use of threaded couplings is obviated. Thus, by inserting either end of the member $11^a$ into the socket 23 or the socket at the other end of the member $10^a$ a variety of forms of fittings may be produced.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure what is thus described by United States Letters Patent is:

A coupling comprising one right angular tubular member having a short end and a long end, a relatively deep cylindrical socket of corresponding dimensions formed at the extremity of each end portion, a second tubular member having a semi-circular bend at one end and a right angular bend at its other end, a flange at each extremity of the second member, either adapted to fit in either socket, whereby when the semi-circular terminal of the second member is inserted in the socket of the short end of the first member the other terminals may be in alinement and capable of relative rotation, and rings inserted in said socket after the flanged terminal is inserted to form a packing and hold the members together.

In testimony whereof I affix my signature in presence of a witness.

EUGENE FORRER. [L. S.]

Witness:
 W. SEAMAN.